United States Patent Office 3,119,652
Patented Jan. 28, 1964

3,119,652
PRODUCTION OF HYDRAZINE BORANES
Henry S. Uchida, Mars, and Gerald T. Hefferan, Butler, Pa., assignors to Callery Chemical Company, Pittsburgh, Pa., a corporation of Pennsylvania
No Drawing. Filed June 20, 1960, Ser. No. 37,033
9 Claims. (Cl. 23—14)

This invention relates to the production of compounds in which hydrazine is coordinated with borane, $BH_3$.

Hydrazine-boranes, as that term is used in this specification, includes hydrazine-borane, $N_2H_4 \cdot BH_3$, and hydrazine-diborane, $H_3B \cdot N_2H_4 \cdot BH_3$. In these compounds the boron of the borane group is coordinated with the nitrogen in hydrazine. The hydrazine-boranes are useful in applications wherein their high hydrogen content is utilized; for example, as reducing agents. When used as reducing agents they can be utilized in the same manner as the related compounds, the amine-boranes, are conventionally used, but provide faster and more efficient reduction because the hydrazine-boranes are stronger reducing agents.

Hydrazine-boranes have been prepared heretofore by the direct reaction of diborane with hydrazine. This reaction is quite exothermic and involves competing side reactions, and some decomposition of the reactants is ordinarily encountered. In addition, the suitability of this method, particularly on any substantial scale, is limited because diborane, an extremely volatile and toxic gas, is somewhat dangerous and hard to handle unless special precautions and special apparatus are used and because the extreme reactivity of diborane makes it necessary to rigorously remove any water from the hydrazine, which is difficult to accomplish.

We have now discovered a new method whereby hydrazine-boranes are prepared efficiently and easily and without the aforementioned disadvantages encountered in the prior art method. Our method comprises the reaction of hydrazine with an addition compound of the formula $X \cdot BH_3$, where X is a compound selected from the group consisting of lower alkylamines and di(lower alkyl) sulfides.

Because hydrazine is a weaker Lewis base than most of the lower alkylamines and lower alkyl sulfides, it is completely unexpected that the exchange reaction which forms the basis for our invention takes place. Thus, in ordinary reactions between a Lewis base-borane adduct and another Lewis base, a stronger Lewis base will displace a weaker Lewis base but a weaker Lewis base does not displace a stronger Lewis base. For example, trimethylamine will displace the weaker Lewis base, dimethylamine, from dimethylamine-borane, thereby producing trimethylamine-borane, but dimethylamine will not displace trimethylamine from trimethylamine-borane. The basis for our invention has been our discovery that, contrary to the accepted theory of Lewis base displacement reactions, hydrazine, the weaker Lewis base in most of the reaction systems of our invention, will displace the stronger Lewis base from adducts of borane with lower alkylamines or lower alkyl sulfides, thereby unexpectedly producing hydrazine-boranes in all cases.

Any lower alkylamine-borane may be used in the practice of the method of our invention. For example, compounds such as dimethylamine-borane, trimethylamine-borane, ethylamine-borane, diethylamine-borane, triethylamine-borane, propylamine-boranes and butylamine-boranes are useful therein. Similarly, any di(lower alkyl) sulfide-borane can be used, such as, for example, dimethyl sulfide-borane, $(CH_3)_2S \cdot BH_3$, diethyl sulfide-borane, $(C_2H_5)_2S \cdot BH_3$, and dibutyl sulfide-borane, $(C_4H_9)_2S \cdot BH_3$.

No particular mode of carrying out the reaction is necessary to the operability of our method, nor are special conditions of reaction required. However, we have found that better yields are obtainable if the lower alkylamine or lower alkyl sulfide which is displaced by the hydrazine during the course of the reaction is distilled off from the reaction mixture. By removing the displaced compound in this manner, the rate of the reaction is increased and the conversions and yields which are obtained are somewhat higher.

Any temperature up to the decomposition temperature of the hydrazine-boranes can be used to carry out the reaction. However, at low temperatures, e.g., below room temperature, the reaction rate is quite slow so that it is preferred to use room temperature or somewhat above during the reaction period, although the reactants are sometimes mixed at a somewhat lower temperature to facilitate handling of volatile reactants. The ordinary temperatures which are preferred for reaction lie between about 25° C. and about 60° C., and temperatures above about 70° C. are not generally used because some decomposition of the product is encountered at such temperatures.

It is also preferred to use an inert solvent in carrying out the process. The use of a solvent gives easier control of the reaction temperature, provides better contact for the reactants and facilitates recovery of the desired product. Any inert solvent is suitable; benzene is one solvent which has been frequently used and has proved to be satisfactory. Other solvents which can be used include the saturated hydrocarbons, for example, pentane or hexane.

In one example of the method of our invention, 4.5 millimols of trimethylamine-borane were added to 10 milliliters of benzene and the solution was mixed with 11.0 millimols of hydrazine. The reaction mixture was then heated to 50° C. for several hours. Very little non-condensible gas was evolved. The benzene and trimethylamine were distilled away at room temperature and the remaining white solid was analyzed. Analysis showed the white solid to be hydrazine-borane, $N_2H_4 \cdot BH_3$.

This and other such tests have shown that whenever at least one mol of hydrazine is used for each mol of $X \cdot BH_3$, hydrazine-borane, $N_2H_4 \cdot BH_3$, is produced in accordance with Equation (1):

(1) 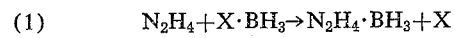 $N_2H_4 + X \cdot BH_3 \rightarrow N_2H_4 \cdot BH_3 + X$

If less than stoichiometric amounts of hydrazine are used, i.e., less than one mol of hydrazine per mol of $X \cdot BH_3$, hydrazine-diborane, $H_3B \cdot N_2H_4 \cdot BH_3$, is also produced in the reaction. It appears that when such proportions are used the hydrazine-borane which is formed in accordance with Equation 1 reacts with the excess $X \cdot BH_3$ present to produce hydrazine-diborane in accordance with Equation 2.

(2)  $N_2H_4 \cdot BH_3 + X \cdot BH_3 \rightarrow H_3B \cdot N_2H_4 \cdot BH_3 + X$ That this reaction takes place is also surprising in view of the accepted theory of Lewis base displacement reactions as discussed above, because $N_2H_4 \cdot BH_3$ is a weak base and is even weaker than hydrazine itself. Therefore, carrying out the reaction in this manner provides a new and unexpected method for the production of hydrazine-diborane. In a test of this embodiment of the invention, 12.4 millimols of trimethylamine-borane in 17 milliliters of benzene were mixed with 5.6 millimols of hydrazine. The mixture was maintained at 25° C. for 1 hour and then was heated to 50° C. for several hours; the reaction vessel was then opened and the solvent and trimethylamine were removed. A white solid was obtained which was analyzed by conventional techniques, including infrared spectrophotometer examination. It was shown that hydrazine-borane, $N_2H_4 \cdot BH_3$, and hydrazine-diborane, $H_3B \cdot N_2H_4 \cdot BH_3$, were the products obtained. A trace of trimethylamine-borane remained in the product.

In these and similar tests, we have found that the relative amounts of hydrazine-borane and hydrazine-diborane can be controlled by varying the ratios of reactants used and the manner in which the reaction is carried out. For example, when a small excess of $X \cdot BH_3$ is used only trace amounts of hydrazine-diborane are obtained, but when a larger excess of $X \cdot BH_3$ is used the amount of hydrazine-diborane produced is substantial. If at least two mols of $X \cdot BH_3$ are used for each mol of hydrazine, substantially only hydrazine-diborane is produced, provided that the displaced Lewis base, i.e., the compound X, is distilled from the reaction mixture during the reaction. If the displaced compound is not removed, an equilibrium is established and a mixture of hydrazine-borane and hydrazine-diborane is obtained. Hydrazine-borane and hydrazine-diborane are separated by conventional techniques, such as fractional sublimation or extraction.

According to the provisions of the patent statutes, we have explained the principle and mode of practicing our invention and have described what we now consider to be its best embodiments. However, we desire to have it understood that, within the scope of the appended claims, the invention may be practiced otherwise than as specifically described.

We claim:
1. A method of producing a hydrazine-borane of the formula $N_2H_4 \cdot (BH_3)_n$, where $n$ is an integer from 1 to 2, which comprises reacting hydrazine with an addition compound of the formula $X \cdot BH_3$, where X is a compound selected from the group consisting of lower alkylamines and di(lower alkyl) sulfides, and recovering the hydrazine-borane thus formed.

2. A method in accordance with claim 1 in which the reaction is carried out in an inert solvent.

3. A method in accordance with claim 1 in which the reaction is carried out at a temperature between about 25° C. and about 60° C.

4. A method in accordance with claim 1 in which the compound X is distilled from the reaction mixture during the reaction.

5. A method of producing hydrazine-borane, $$N_2H_4 \cdot BH_3$$

which comprises reacting hydrazine with an addition compound of the formula $X \cdot BH_3$, where X is a compound selected from the group consisting of lower alkylamines and di(lower alkyl) sulfides, using a molar ratio of hydrazine to $X \cdot BH_3$ of at least 1 to 1, and recovering the hydrazine-borane thus formed.

6. A method of producing hydrazine-diborane, $$H_3B \cdot N_2H_4 \cdot BH_3$$

which comprises reacting hydrazine with an addition compound of the formula, $X \cdot BH_3$, where X is a compound selected from the group consisting of lower alkylamines and di(lower alkyl) sulfides, using a molar ratio of $X \cdot BH_3$ to hydrazine of more than 1 to 1, and recovering the hydrazine-diborane thus formed.

7. A method in accordance with claim 6 in which said molar ratio is at least 2 to 1 and the compound X is distilled from the reaction mixture during the reaction.

8. A method of producing a hydrazine-borane of the formula $N_2H_4 \cdot (BH_3)_n$, where $n$ is an integer from 1 to 2, which comprises reacting hydrazine with a lower alkylamine-borane in an inert solvent and at a temperature between about 25° C. and 60° C., and recovering the hydrazine-borane thus formed.

9. A method in accordance with claim 8 in which the lower alkylamine-borane is trimethylamine-borane.

References Cited in the file of this patent

Germany, Auslegeschrift publication 1,018,397, October 31, 1957.